Dec. 2, 1958  W. J. STURM  2,863,062
METHOD OF MEASURING THE INTEGRATED ENERGY
OUTPUT OF A NEUTRONIC CHAIN REACTOR
Filed June 10, 1946  2 Sheets-Sheet 1
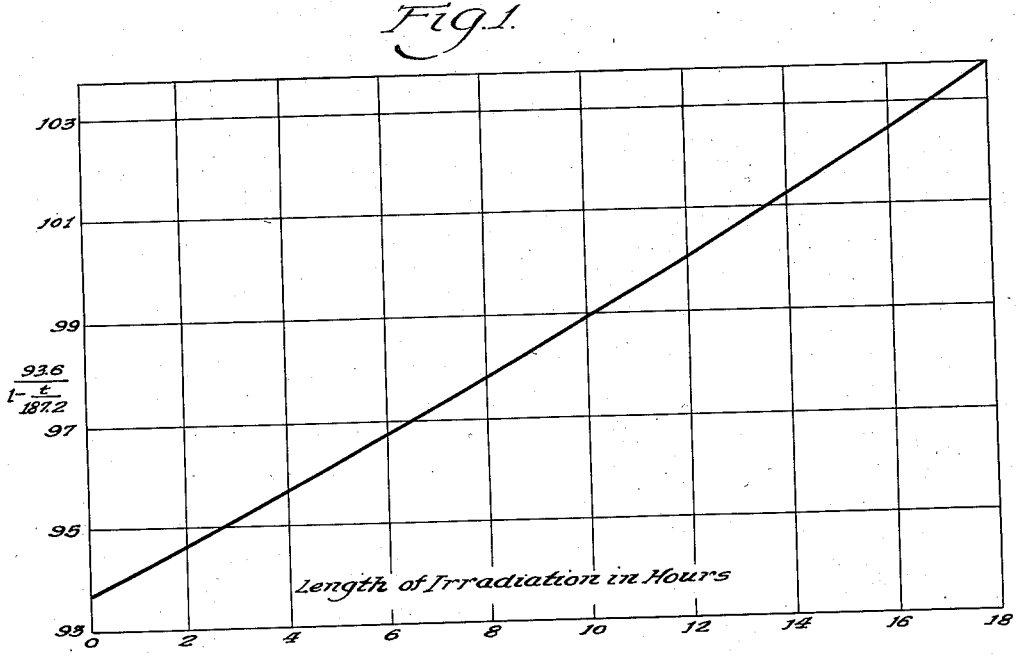
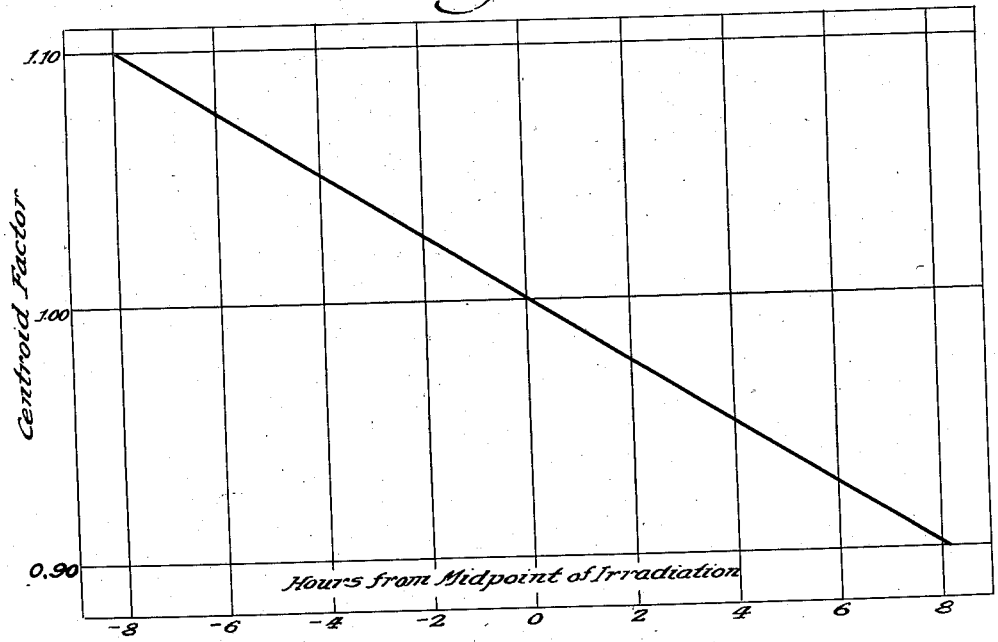
Inventor:
William J. Sturm
By Robert A. [signature]
Attorney Dec. 2, 1958 W. J. STURM 2,863,062
METHOD OF MEASURING THE INTEGRATED ENERGY
OUTPUT OF A NEUTRONIC CHAIN REACTOR
Filed June 10, 1946 2 Sheets-Sheet 2

Inventor:
William J. Sturm
By: Robert A. Levenson
Attorney

United States Patent Office 2,863,062
Patented Dec. 2, 1958

2,863,062

METHOD OF MEASURING THE INTEGRATED ENERGY OUTPUT OF A NEUTRONIC CHAIN REACTOR

William J. Sturm, Chicago, Ill., assignor to the United States of America as represented by the United States Atomic Energy Commission Application June 10, 1946, Serial No. 675,791

2 Claims. (Cl. 250—83)

This invention relates to an improved means and method of measuring the integrated energy output of a neutronic chain reactor over long periods of time by measurement of the radioactivity induced in metal foils placed within the reactor.

Before the invention, the method of determination of the total energy output of a neutronic chain reactor over a given period of time consisted of mathematical interpretation of a graph or chart of instantaneous power output as drawn by a recording device. This method is simple in the case where the power output is constant, or follows the curve of a well-known mathematical function, over the period under examination. However, in the usual case these conditions are not met, and the more complicated methods of graphical integration must be employed.

The principal object of the invention is to provide an improved means and method of measuring integrated power output of a neutronic chain reactor.

Other objects of the invention will appear from the description which appears below. For an understanding of the invention, reference is made in the description to the drawings, in which:

Figure 1 is a graph of a mathematical function, reference to which graph may be used to obviate a mathematical computation in the practice of the invention;

Figure 2 is a graph from which the correction factor required for accuracy in certain cases may be determined in the practice of the invention.

Figure 3:
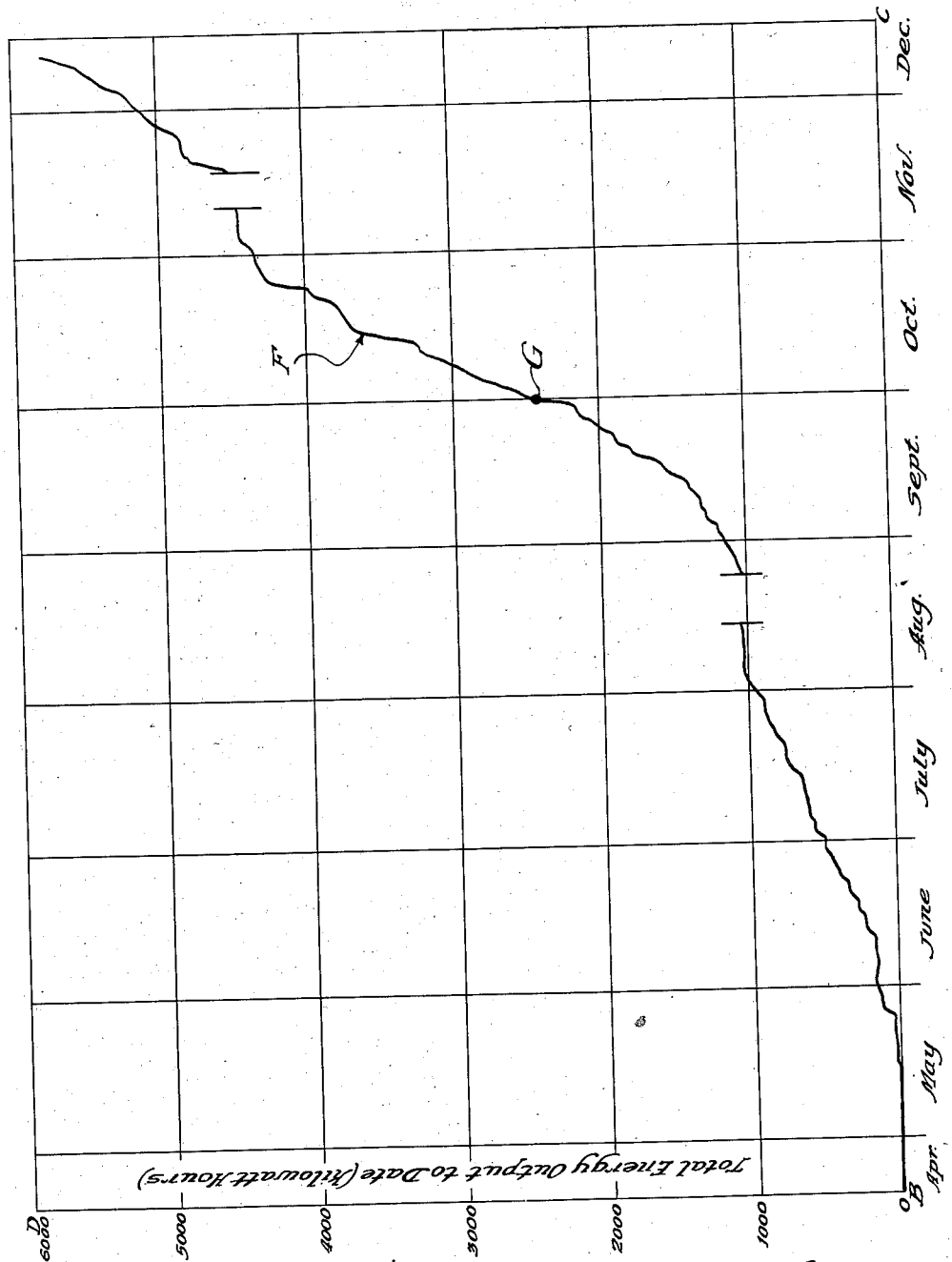
Figure 3 is a specimen graph of the integrated power output of a chain reactor over a period of eight months, the data for such graph having been obtained by practicing the invention.

The method of measuring neutron flux density in a neutron beam such as that from a cyclotron by the use of foils has long been known in the art. The method relies on the fact that many stable elements, when irradiated by neutrons, absorb neutrons in their nuclei and become unstable radioactive isotopes which emit characteristic particles and radiations. For any given neutron flux the number of such radioactive nuclei which are formed in a given time in a given foil of the element is proportional to a quantity called the absorption cross-section of the element, which may for present purposes be defined as a factor proportional to the probability that any single neutron which strikes the foil will be absorbed in a nucleus to create the effect described. When the foil is first exposed to the neutron beam the number of unstable nuclei in the foil grows rapidly. However as the irradiation continues an increasing number of the unstable isotope nuclei emit the characteristic radiation and thus, for present purposes, disappear. Thus the growth of radioactivity does not continue indefinitely. If a foil be allowed to remain in the neutron flux field long enough, its activity will reach a saturation value, $A_s$, proportional to the intensity of the neutron flux. A common method of measuring neutron flux, therefore, is to irradiate the foil long enough for its activity to reach the saturation value and then to measure the activity. Another method which has been used, particularly in high flux fields where $A_s$ is so great that it would be difficult to measure, is to expose the foil for a measured short time and calculate $A_s$, the saturation activity, from the known laws of growth.

The growth of the activity is represented by the equation $$A = A_s\left(1 - e^{-\frac{t}{T}}\right)$$

where $A$ is the activity at a time $t$ after the commencement of irradiation, $A_s$ is the saturation activity, $e$ is the base of natural logarithms, and $T$ is a time called the mean life of the radioactive isotope.

Since the invention of the neutronic chain reactor, such foils have been used to measure the power output, or rate of energy output, of such reactors, it being well known that at most points of a chain reactor, the instantaneous neutron flux is proportional to the instantaneous power output.

The essence of the present invention lies in a method using foil measurements to determine the integrated power output, or total energy output, over a period of time, as opposed to the instantaneous power output, or rate of energy output. This cannot be accomplished by the foil methods heretofore used.

From the law of growth given above, there has been determined an expression for the integrated energy output, $E$, of a neutronic chain reactor during a time $t$, in terms of the activity induced in the foil, as follows:

$$E = kA\left[\frac{T}{1 - \frac{t}{2T}}\right]$$

where $k$ is a constant calibration factor depending upon the particular foil selected, $A$ is the activity of the foil after irradiation for time $t$, $T$ is the mean life of the induced radioactivity and $t$ is the time of irradiation of the foil. This equation is accurate for irradiations taking place over a time less than one-fifth the mean life of the radioactive isotope. A slight inaccuracy may be introduced if the total energy output occurs in a period of time very short compared to the total time of measurement, either at the beginning or at the end of such period.

In determining the calibration factor $k$ for a foil or a set of identical foils, the foil, or one of the foils if there is a set, is irradiated in the neutronic chain reactor for a time less than one-fifth the mean life, the total energy output during such time being known. Its activity is then determined and the calibration factor $k$ computed from the equation $$k = \frac{E_0}{A_0}\left[\frac{1 - \frac{t_0}{2T}}{T}\right]$$

which is derived by rearrangement of the equation for unknown integrated energy output, $E$, given above. $E_0$ is the known energy output, $A_0$ is the measured activity of the foil, and $t_0$ is the time of the calibration irradiation. It should be noted that the units chosen for expression of any of these quantities are immaterial, so long as the same units are used throughout the steps of my method. $E$ and $E_0$ will of course ordinarily be expressed in kilowatt hours, and $T$, $t$ and $t_0$ will for most measurements be expressed in hours. The units $A$ and $A_0$ may be expressed in any arbitrary units desired, such as scale divisions on an electroscope, current in an ionization chamber, or counts per minute on a pulse counter. Thus it is not necessary to make any absolute measurement of the activity, only relative activity being of importance.

Once the foil is calibrated by determining the calibration factor $k$ as above stated, it may be used to determine the total energy output of the chain reactor over any time interval shorter than approximately one-fifth the mean life of the induced radioactivity; the latter limitation is imposed by the limits of accuracy mentioned above. The measurement is made simply by irradiating the foil during the period concerning which the information is sought, measuring the activity of the foil, and applying the equation for the energy output, E, above.

In practicing the invention it has been found that the best element for use as a foil material for this purpose in day-to-day measurements is gold. The advantages of this element for this purpose are twofold. First, the neutron flux induces in it only one radioactive isotope, thus rendering measurement of the activity rather simple. Second, the mean life of the induced radioactivity is 93.6 hours, thus rendering possible the measurement of integrated energy output over relatively long periods of time. In the case of pure gold, $$E = kA \left[ \frac{93.6}{1 - \frac{t}{187.2}} \right]$$

and $$k = \frac{E_0}{A_0} \left[ \frac{1 - \frac{t_0}{187.2}}{93.6} \right]$$

where all symbols are as stated above.

In order to obviate repeated computations, there has been constructed the graph of Figure 1, from which may be read, for any given irradiation period $t$ of a gold foil, the value of the multiplication factor.

$$\frac{93.6}{1 - \frac{t}{187.2}}$$

the latter constituting the ordinate value, and the period of irradiation the abscissa value, on the graph.

For great accuracy, in cases where there have been extreme fluctuations of the instantaneous power output during the time of irradiation of the foil, particularly where the greatest portion of the overall energy output is known to occur just after the commencement, or just before the termination, of the irradiation, a centroid correction factor is applied to the results computed as above. To present an idea of the order of magnitude of the error introduced by failing to use the correction factor, it need only be stated that with an 8-hour irradiation of the gold foil, the uncorrected energy output computation will be approximately 5 percent low if all the energy was released in the first few minutes, or 5 percent high if all the energy was released in the last few minutes. The centroid factor is applied by making an estimate of the time interval by which the point of time at which half of the total energy released during the period has been released precedes or follows the point of time constituting the mid-point of the irradiation period. The centroid correction factor is then determined from the graph of Figure 2, wherein the centroid factor is the ordinate and such time interval is the abscissa, the values of time being designated as negative where more than half of the energy was liberated before the mid-point of the irradiation period, and positive under the opposite conditions. The uncorrected value as determined above is multiplied by the centroid correction factor for accuracy.

The graph of Figure 3 is a graph of the total integrated power output of a graphite-uranium lattice neutronic chain reactor, over a period of approximately 8 months, constructed from data obtained by inserting, exposing, removing and measuring the induced radioactivity of calibrated foils in the manner described above. In this practice of the method, there were employed 72 gold foils of equal dimensions, one being used each day, thus allowing the radioactivity induced to disappear almost completely before reusing a foil.

In Figure 3, the abscissa axis B—C represents time, commencing at the origin with April 20, 1943, the date of commencement of operation of the chain reactor, and terminating with December 15, 1943. The ordinate values B—D represent total integrated energy output of the chain reactor since commencement of its operation. Thus, taking any point on curve F, the ordinate value of such point indicates the total energy output, in kilowatt-hours, of the chain reactor from the date of its being placed in operation to the date represented by the corresponding abscissa value. Gaps in the curve represent periods during which the reactor was shut down to remove and place uranium metal in the lattice. As an instance illustrating the information obtainable from the graph of Figure 3 it is ascertained from point G that on October 1, 1943, the chain reactor had produced since the commencement of its operation 2,420 kilowatt-hours of energy.

What is claimed is:

1. In a method of measuring the integrated energy output of a neutronic chain reactor, the steps of successively irradiating calibrated thin foils of an element which is rendered radioactive by exposure to neutron flux for periods of time not greater than one-fifth the mean life of the induced radioactivity, and producing an indication of the radioactivity induced in each foil, each foil being introduced into the reactor immediately upon removal of its predecessor.

2. A method of measuring the integrated energy output of a neutronic reactor, said method comprising the steps of irradiating a calibrated thin foil of an element which is rendered radioactive by exposure to neutron flux for a period of time not longer than one-fifth the mean life, T, of the induced radioactivity, producing a first output, A, proportional to the radioactivity induced in the foil, producing a second output, $t$, proportional to the period of time that the foil is irradiated, and producing an indication of energy, E, in accordance with the relation $$E = kA \left[ \frac{T}{1 - \frac{t}{2T}} \right]$$

References Cited in the file of this patent

UNITED STATES PATENTS

| | | |
|---|---|---|
| 2,186,757 | Kallmann et al. | Jan. 9, 1940 |
| 2,206,634 | Fermi et al. | July 2, 1940 |
| 2,279,023 | Kallmann et al. | Apr. 7, 1942 |
| 2,491,320 | Koontz | Dec. 13, 1949 |